United States Patent [19]

Sakakibara

[11] 4,392,896
[45] Jul. 12, 1983

[54] METHOD OF PRODUCING A GYPSUM PLASTER BOARD

[75] Inventor: Syoji Sakakibara, Nagoya, Japan

[73] Assignee: Sakakibara Sangyo Kabushiki Kaisha, Nagoya, Japan

[21] Appl. No.: 340,183

[22] Filed: Jan. 18, 1982

[51] Int. Cl.³ .................... B32B 31/06; B32B 13/08
[52] U.S. Cl. .......................... 156/39; 106/114; 264/333; 424/94; 428/312.4; 435/275; 536/102
[58] Field of Search .............. 156/39; 106/114; 424/94; 428/312.4; 435/275; 536/102; 264/42, 333

[56] References Cited

U.S. PATENT DOCUMENTS

| | | | |
|---|---|---|---|
| 3,258,407 | 6/1966 | Blanchon | 435/275 X |
| 3,516,882 | 6/1970 | Cummisford | 156/39 |
| 4,148,781 | 4/1979 | Narukawa et al. | 156/39 X |

Primary Examiner—Robert A. Dawson
Attorney, Agent, or Firm—Erwin S. Teltscher; Allison C. Collard; Thomas Galgano

[57] ABSTRACT

A method of producing a gypsum plaster board. This method includes a step of preparing a starch paste which is effective to bond the gypsum core member and both paper boards. In this step, first, about 10-30 wt % of starch such as corn starch based on water is added to water and mixed to obtain milk of starch. Next, about 0.1-1.5 wt % of amylolytic enzyme such as α-amylase based on the starch is added and then heated to the decomposition point of the starch with stirring. After the heating is stopped at the range of DH 0.1-10, about 0.8-1.0 wt % of an enzyme deactivating agent based on the starch is added and mixed with water to prepare a starch paste. After the starch paste being prepared by the aforementioned process, a raw material of the gypsum core member, that is, calcined gypsum, reinforcing agent such as glass fiber, weight reducing agent such as surface active agent and the starch paste are mixed with water to obtain gypsum slurry. Then, the gypsum slurry is poured between porous sheets such as paper boards. Thereafter, the unset gypsum plaster board is molded to a predetermined thickness by a molding roller and is set by hydration at room temperature. The set gypsum plaster board is cut to a predetermined size by a cutting machine, and it is dried at about 50°-200° C. to evaporate excessive moisture in the gypsum plaster board.

12 Claims, 3 Drawing Figures

METHOD OF PRODUCING A GYPSUM PLASTER BOARD

BACKGROUND OF THE INVENTION

This invention generally relates to a method of producing a gypsum plaster board formed of a gypsum core member and porous sheet members such as paper boards bonded on both surfaces of the gypsum core member, and more particularly to a method of preparing starch paste for use in producing gypsum plaster boards.

Traditionally, in production of gypsum plaster boards, raw material of the gypsum core member, that is, calcined gypsum, reinforcing agent such as glass fiber, and weight reducing agent such as surface active agent are mixed with water to obtain gypsum slurry, which in turn is poured between two porous sheet members such as paper boards. Thereafter, the unset gypsum plaster board is molded to a predetermined thickness by a molding roller or the like and is set by hydration at room temperature. The set gypsum plaster board is then cut to a predetermined size by a cutting machine or other suitable means, and it is dried at about 50°–200° C. to evaporate excessive moisture in the gypsum plaster board. The above process is continuous and the productivity of the gypsum plaster boards is dependent on the drying capacity. Thus, the gypsum plaster boards are dried at relatively high temperatures so that usually the productivity may be increased. However, this practice is disadvantageous, because the temperature of the products in a drying machine increases and the adhesion between the gypsum core member and the paper boards bonded to the core member will be deteriorated.

The adhesion between the gypsum core member and the both paper boards are generally obtained by the development and linkage of a crystal of gypsum dihydrate into the fiber of the paper boards in the setting process.

To prevent a crystal of gypsum dihydrate from being calcined and dehydrated to give a gypsum hemihydrate in drying at high temperatures and to prevent separation of the gypsum core member from both paper boards, starch paste such as denatured starch or dextrin as an auxiliary adhesive, and a hardening modifier are added to the raw material of the gypsum core member. In drying at high temperatures, the starch paste is effective to migrate with water in the gypsum core member toward the interface between the gypsum core member and both paper boards and effective to cover the crystal of gypsum dihydrate due to water retentivity of the starch paste which developed into the fiber of the paper boards so as to prevent the calcination and dehydration of the crystal.

In the prior art, since starch paste is added as it is in a powdered state, the molecular weight of the starch paste rapidly increases and is gelatinated by heat. As a result, the migration of the starch paste toward the interface may be unsufficiently carried out and a large amount of starch remains in the gypsum core member. Accordingly, a large amount of adhesive is disadvantageously required and especially, in the case that a denatured starch or dextrin is used, production of gypsum plaster boards tends to be costly.

SUMMARY OF THE INVENTION

Accordingly, it is an object of the present invention to provide a method of preparing starch paste and producing economically gypsum plaster boards using a small amount of the starch paste.

According to the present invention, as shown in FIG. 1, about 10–30 wt % of starch such as corn starch based on water is first added to water and mixed to obtain milk of starch. About 0.1–1.5 wt % of amylolytic enzyme such as α-amylase based on the starch is added and then heated to the decomposition point of the starch with stirring. After the heating operation is stopped at the range of DH (the rate of decomposition) 0.1–10 which may be indicated by reddish brown color of idometrical coloration, about 0.8–1.0 wt % of an enzyme deactivating agent based on the starch is added and mixed with water to prepare a starch paste.

The rate of decomposition (DH) of starch as mentioned above is obtained by the following equation:

$$DH\text{(the rate of decomposition of starch)} = \frac{\text{the amount of reducing sugar}}{\text{the amount of total sugar}} \times 100\ (\%)$$

The starch used in the present invention includes a substance containing 1–100 wt % of starch matter such as corn flour, wheat starch, wheat flour, potato starch, sweet potato starch, tapioca starch, tapioca flour, and sago palm starch as well as corn starch.

The amylolytic enzyme used in the present invention includes all kinds of enzyme that can decompose starch matter such as β-amylase as well as α-amylase. When the raw material of starch contains protein and cellulose matters, a proteolytic enzyme and cellulolytic enzyme in addition to an amylolytic enzyme may be respectively used.

The enzyme deactivating agent used in the present invention may be TMTD(tetramethylthiuram disulfide), Bioside E (a mixture of TMTD, CaOH$_2$ and CaCO$_3$), EDTA(ethylenediamine tetraacetic acid) or copper sulfate. Other methods for deactivating enzyme may be a method for reducing the pH of starch paste below 4 by adding a strong acid or the like, a method of heating starch paste at higher temperatures than 100° C., and so on.

After the starch paste being prepared by the aforementioned process, a raw material of the gypsum core member, that is, calcined gypsum, reinforcing agent such as glass fiber, weight reducing agent such as surface active agent, and the starch paste are mixed with water to obtain gypsum slurry. Then, the gypsum slurry is poured between porous sheet members such as paper boards. Thereafter, the unset gypsum plaster board is molded to a predetermined thickness by a molding roller and is set by hydration at room temperature. The set gypsum plaster board is cut to a predetermined size by a cutting machine or other suitable means and it is dried at about 50°–200° C. to evaporate excessive moisture in the gypsum plaster board.

The reinforcing agent used in the present invention includes natural fibers such as pulp and waste paper, synthetic fibers such as nylon, polypropylene and polyester, or metallic fibers. The amount of addition of the reinforcing agent is about 0.3 wt % based on a calcined gypsum to be used.

In the inventive process of preparing the starch paste, inexpensive raw material of starch is utilized and the starch is decomposed so that a desired adhesion may be obtained and the starch paste is prepared. Furthermore, during the bonding process, since the starch paste in an emulsified state is mixed with the raw material of the gypsum core member to obtain a gypsum slurry and the gypsum core member and both paper boards are bonded together, the starch paste can readily migrate toward the interface between the gypsum core member and both paper boards, resulting in superior adhesion.

Other features and advantages of the invention will be apparent from the following description taken in connection with the accompanying drawing wherein:

DETAILED DESCRIPTION OF THE PREFERRED EMBODIMENTS

Figure 1:
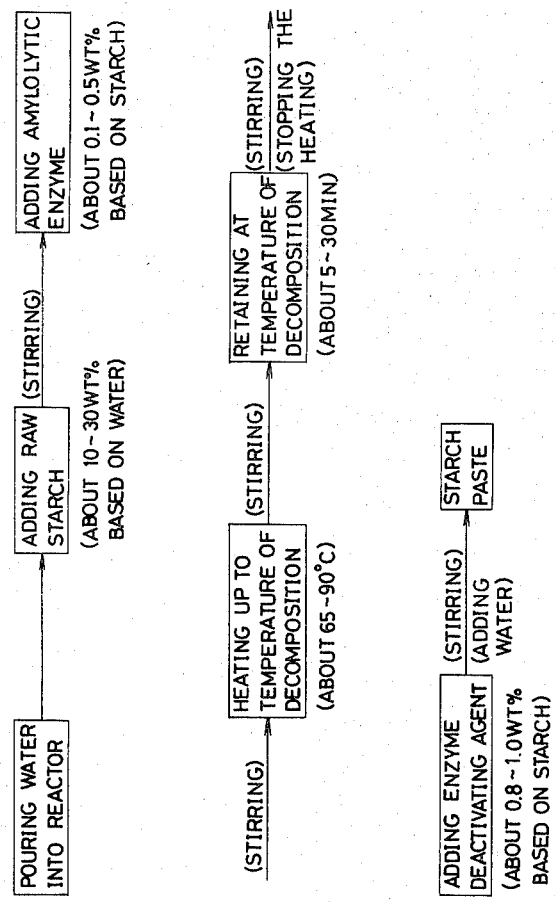
FIG. 1 is a schematic flow diagram showing a process of preparing the starch paste used in the present invention.

In the following, some examples of the present invention are shown.

EXAMPLE 1

Into 200 ml. of water, 100 g. of corn starch was added to form milk of starch, into which 0.14 wt % of $\alpha$-amylase (3000 LSV) based on corn starch was added. Then it was stirred at 65°–90° C. for 10–20 minutes and the heating was stopped at a point where the reddish brown color of idometric coloration was indicated. (DH 2-4). Then, 1.0 wt % of Bioside E based on corn starch was added with stirring for 5 minutes and then mixed with 300 ml. of water to prepare starch paste.

As a raw material of gypsum core member, the gypsum slurry having the following composition by weight was prepared.

| | |
|---|---|
| Calcined gypsum | 100 parts |
| Chip-shaped glass fiber | 0.1–0.3 parts |
| Foam of nonionic surface active agent such as polyethylene glycol alkyl ether | 0.05–0.1 Parts |
| Raw starch | 0.1–2.0 parts |
| Water | 60–80 parts |

EXAMPLE 2

Into 200 ml. of water, 100 g. of corn flour was added to form milk of starch, into which 0.16 wt % of $\alpha$-amylase(3000 LSV) based on corn flour and a slight amount of protease were added. Then the starch was decomposed under the same conditions of reaction as Example 1. Then, 0.8 wt % of TMTD based on corn flour was added with stirring for 5 minutes and then mixed with 300 ml. of water to prepare starch paste. (In this example, the DH of starch was 1–5.)

Thereafter, the gypsum slurry having the following composition by weight was prepared.

| | |
|---|---|
| Calcined gypsum | 100 parts |
| Chip-shaped glass fiber | 0.2 parts |
| Foam of nonionic surface active agent such as polyethylene glycol alkyl ether | 0.1 parts |
| Raw starch | 0.6 parts |
| Water | 70 parts |

EXAMPLE 3

Into 200 ml. of water, 100 g. of tapioca flour was added to form milk of starch, into which 0.18 wt % of $\alpha$-amylase(3000 LSV) based on tapioca flour and a slight amount of protease and cellulase were added. Then it was stirred at 65°–85° C. for 10–20 minutes and was heated until DH 3–6 was reached. Then, 1.0 wt % of EDTA based on tapioca flour was added with stirring for 5 minutes and then mixed with 300 ml. of water to prepare starch paste. Thereafter, in the same process as of Example 1, a gypsum slurry was prepared.

EXAMPLE 4

Using tapioca starch instead of corn starch as used in Example 1, 0.18 wt % of $\alpha$-amylase(3000 LSV) based on tapioca starch was added. Then, under the same conditions as in Example 1, a starch paste was prepared, d(DH 4–8) and then a gypsum slurry was prepared in the same process as of Example 1.

EXAMPLE 5

Using potato starch instead of corn starch as used in Example 1, 0.16 wt % of $\alpha$-amylase(3000 LSV) based on potato starch was added. Reaction by the enzyme was carried out at 60°–85° C. for 10–20 minutes with stirring. (DH 6–10). Thereafter, under the same conditions as in Example 1, a gypsum slurry was prepared.

EXAMPLE 6

Using wheat flour instead of corn starch as used in Example 1, 0.16 wt % of $\alpha$-amylase(3000 LSV) based on wheat flour was added. Reaction by the enzyme was carried out at 50°–70° C. for 10–20 minutes with stirring. (DH 0.1–2). Thereafter, under the same conditions as in Example 1, a gypsum slurry was prepared.

The gypsum slurry containing the starch paste prepared in the previous described examples 1–6 is used at the same percentages for continuously producing plaster boards.

Figure 2:
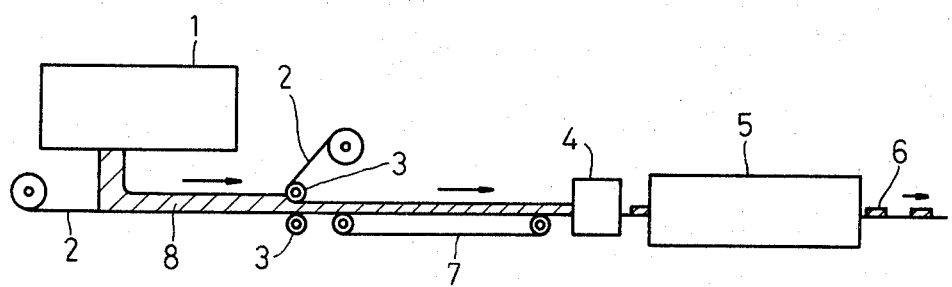
FIG. 2 is a schematic side view showing a machine operation used for continuously producing the gypsum plaster boards according to the present invention.

Referring to FIG. 2, the gypsum slurry containing the starch paste were poured from mixer 1 between porous paper boards 2 (thickness was 0.5 mm.) and molded to 9 mm. of thickness by molding rollers 3. Thereafter, it was allowed to stand on the belt conveyer 7 at room temperature and set by hydration. The set gypsum plaster board is cut to a predetermined size by a cutting machine 4 and it was dried at 50°–150° C. for 60 minutes to obtain a gypsum plaster board 6.

Figure 3:
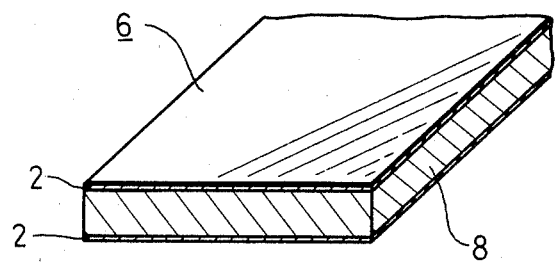
FIG. 3 is a partially broken away perspective view of the gypsum plaster board produced by the present invention.

As shown in FIG. 3, the obtained gypsum plaster board 6 is of a hard board structure where a gypsum core member 8 is interposed between both paper boards 2 and such two materials are integrally combined. The plaster boards produced in the continuous process show the same superior result as in the experimental process.

Tables 1 and 2 show the result of adhesion between the paper boards and the gypsum core member of the gypsum plaster board obtained in the present examples as compared with those in the prior art. In the present embodiments, corn starch, potato starch and tapioca starch were used as a raw starch, while in the embodiments in the prior art, denatured starch and dextrin were used as a raw starch.

TABLE 1

|  | Present Embodiments | | | Prior Art | |
| --- | --- | --- | --- | --- | --- |
| Raw Starch | Corn Starch | Potato Starch | Tapioca Starch | Denatured Starch | Dextrin |
| Amount of addition of Starch (wt % based on calcined gypsum) | 0.6 | 0.6 | 0.6 | 0.6 | 0.6 |
| Adhesion (%) | 100 | 100 | 100 | 70 | 80 |

TABLE 2

|  | Present Embodiments | | | Prior Art | |
| --- | --- | --- | --- | --- | --- |
| Raw Starch | Corn Starch | Potato Starch | Tapioca Starch | Denatured Starch | Dextrin |
| Amount of addition of Starch (wt % based on calcined gypsum) | 0.6 | 0.6 | 0.6 | 1.0 | 1.0 |
| Adhesion (%) | 100 | 100 | 100 | 90 | 90 |

In Tables 1 and 2, the measurements of adhesion were indicated in such a manner that the paper board of the gypsum plaster board was cut with a knife at intervals of 25 mm. to be separated from the gypsum core member and when the paper board and the gypsum core member were completely bonded, the adhesion was 100%; when they were not bonded at all, the adhesion was 0%.

Table 1 shows a comparison between the present embodiments and the embodiments in the prior art, in the case that the amount of addition of raw starch in each embodiment is same. It can be appreciated that the adhesion is superior to that in the prior art.

In Table 2, it should be apparent that in order to obtain adhesion in the present invention, the amount of denatured starch or dextrin must be increased.

Consequently, according to the present embodiment, superior adhesion can be obtained by using a relatively smaller amount of inexpensive raw starch.

As many apparently widely different embodiments of this invention may be made without departing from the spirit and scope thereof, it is to be understood that the invention is not limited to the specific embodiments thereof except as defined in the appended claims.

What is claimed is:

1. Method of producing a gypsum plaster board comprising the steps of:
   (a) preparing a starch paste wherein starch is added into water with stirring to form milk of starch, into which an amylolytic enzyme is added, and heated with stirring until the decomposition temperature of said starch is reached, and then the heating operation is stopped at a point of DH 0.1-10 and an enzyme deactivating agent is added and stirred with water;
   (b) mixing said starch paste with a raw material of a gypsum core member containing calcined gypsum, reinforcing agent and weight reducing agent as well as water to prepare a gypsum slurry;
   (c) producing a gypsum plaster board wherein said gypsum slurry is poured between porous sheets such as paper boards and molded to a predetermined thickness by a molding device, then said gypsum slurry is set by hydration at room temperature and dried at about 50°-200° C. so as to evaporate excessive moisture therein.

2. The method as claimed in claim 1 wherein 100-300 parts by weight of corn starch as said starch is added into 1000 parts by weight of water, and 0.1-1.5 parts by weight of α-amylase (3000 LSV) as said amylolytic enzyme is added, and heated at 65°-90° C. for 5-30 minutes, thereafter 0.8-1.0 parts by weight of a mixture of tetramethylthiuram disulfide, $Ca(OH)_2$ and $CaCO_3$ as said enzyme deactivating agent is added.

3. The method as claimed in claim 2 wherein corn flour as said starch is used and a slight amount of protease as a proteolytic enzyme is further added in addition to said α-amylase.

4. The method as claimed in claim 2 wherein tapioca flour as said starch is used and a slight amount of protease as a proteolytic enzyme and a slight amount of cellulase as a cellulolytic enzyme is further added in addition to said α-amylase, said decomposition temperature of starch is 65°-85° C.

5. The method as claimed in claim 2 wherein said starch is selected from the group consisting of tapioca starch, potato starch, sweet potato starch, wheat starch, wheat flour and sago palm starch.

6. The method as claimed in claim 1 wherein said reinforcing agent is selected from the group consisting of glass fiber, natural fiber, synthetic fiber and metallic fiber.

7. The method as claimed in claim 1 wherein said weight reducing agent is nonionic surface active agent.

8. In producing a gypsum plaster board, a method of preparing a starch paste comprising the steps of adding starch into water with stirring to form milk of starch; adding an amylolytic enzyme into said milk of starch; heating said milk of starch up to the decomposition temperature of said starch with stirring; stopping the heating at a point of DH 0.1-10; and adding an enzyme deactivating agent into the decomposed product and mixing with water.

9. The method as claimed in claim 8 wherein 100-300 parts by weight of corn starch as said starch is added into 1000 parts by weight of water, and 0.1-1.5 parts by weight of α-amylase(3000 LSV) as said amylolytic enzyme is added, and heated at 65°-90° C. for 5-30 minutes, thereafter 0.8-1.0 parts by weight of a mixture of tetramethylthiuram disulfide, $Ca(OH)_2$ and $CaCO_3$ as said enzyme deactivating agent is added.

10. The method as claimed in claim 9 wherein corn flour as said starch is used and a slight amount of protease as a proteolytic enzyme is further added in addition to said α-amylase.

11. The method as claimed in claim 9 wherein tapioca flour as said starch is used and a slight amount of protease as a proteolytic enzyme and a slight amount of cellulase as a cellulolytic enzyme is further added in addition to said α-amylase, said decomposition temperature of starch is 65°-85° C.

12. The method as claimed in claim 9 wherein said starch is selected from the group consisting of tapioca starch, potato starch, sweet potato starch, wheat starch, wheat flour and sago palm starch.

* * * * *